United States Patent [19]

Gjendemsjo

[11] Patent Number: 4,579,753

[45] Date of Patent: Apr. 1, 1986

[54] SURVIVAL BLANKET OF ARTIFICIAL FUR PILE FABRIC

[75] Inventor: Peder Gjendemsjo, Tomrefjord, Norway

[73] Assignee: A/S More Tekstilfabrikk, Gåseid, Norway

[21] Appl. No.: 647,804

[22] Filed: Sep. 5, 1984

[30] Foreign Application Priority Data

Aug. 31, 1983 [NO] Norway ................................ 883318

[51] Int. Cl.[4] ................................................ B32B 3/02

[52] U.S. Cl. ........................................ 428/17; 2/69.5; 428/92

[58] Field of Search ...................... 428/95, 17; 2/69.5; 5/82 R, 82 B, 413, 419

[56] References Cited

U.S. PATENT DOCUMENTS 4,461,791 7/1984 Matsui .................................. 428/17

*Primary Examiner*—Marion C. McCamish

*Attorney, Agent, or Firm*—Merchant, Gould, Smith, Edell, Welter & Schmidt

[57] ABSTRACT

A survival blanket especially intended for transporting and holding injured and sick persons consists of a surface element divided into four areas, i.e., a centrally disposed, substantially rectangular body section, an adjacent, also substantially rectangular, smaller or inner fold flap, a similarly adjacent, also substantially rectangular, larger or outer fold flap, and a head section disposed at one end of the body section. On the outside surface of the blanket, along fold lines and between the middle area and the side areas, respectively, carrying straps with loops are provided, said straps being secured, preferably by sewing, to reinforcing strips provided along the fold lines. The outer, free edge of the larger fold flap is provided with fastening means for engagement with corresponding fastening means along the outside surface of the fold line, and edge strips with drawstring closures are provided around the periphery of the head section and along the foot ends of the sections, for closing the respective ends of the bag.

6 Claims, 3 Drawing Figures

SURVIVAL BLANKET OF ARTIFICIAL FUR PILE FABRIC

Figure 1:
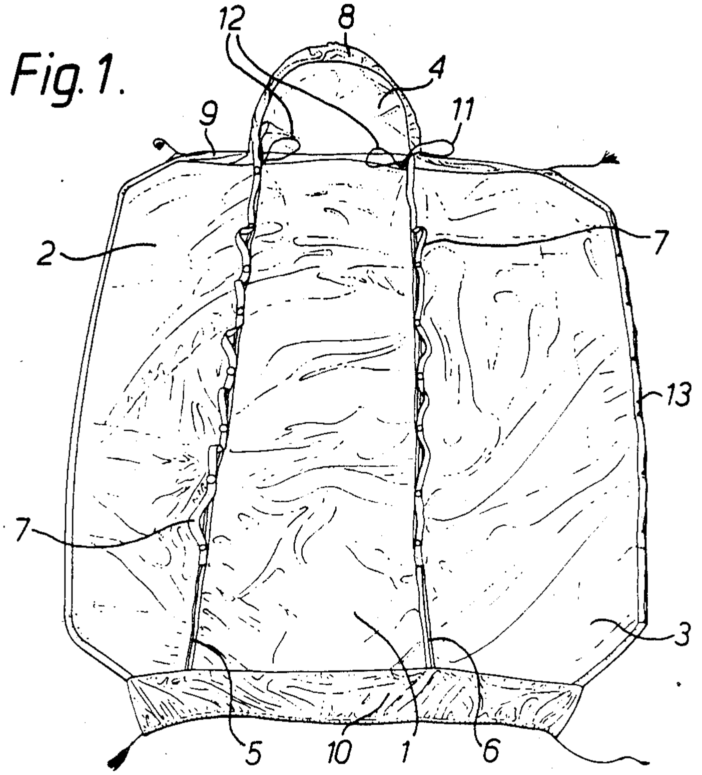

The present invention relates to a survival blanket, intended especially for holding and transporting sick and injured persons.

The survival blanket is meant to replace the material that is now used for this purpose by such groups as the armed forces, the Red Cross, and other first-aid, emergency relief and rescue teams.

The woollen blanket is the material most often used today. Under extreme conditions, a sick or injured person may require up to four wool blankets, which requires an extensive store of supplies and entails large expenses in connection with cleaning and wear.

A survival blanket should satisfy the following conditions: 1. Under all conditions and temperatures, at least down to −25° C., the blanket should retain its pliability while at the same time retaining the favorable properties of the material; 2. It must be thermally insulating down to −25° C.; 3. It must be waterproof, have high tear resistance, retain its shape, and be anti-allergic; 4. It must be able to withstand repeated washings at temperatures up to 90° C., it must be able to be disinfected/sterilized using any of the common chemical agents, and it must be able to withstand high-pressure rinsing with chemical cleaning compounds.

It has been found that such a material can be obtained through the method described in applicant's simultaneously-filed Norwegian Application No. 833319 which is set forth in part below.

The Norwegian disclosure related to a method for coating a knitted, artificial fur pile fabric.

The fabric (yard goods) of artificial fur pile that is coated in accordance with the invention is preferably a conventional fiber pile produced by ordinary knitted on a Singel jersey-knitting machine with a carding attachment. The pile is suitably first knitted as a sleeve or stocking and the carded fibers, fed as a wick, are knitted into the material. After the sleeve has been cut apart, the fibers are trimmed to the desired length and the fabric is dried to stabilize its width.

The pile fabric has found extensive use, especially as an insulating material in articles of apparel for outdoor activities.

To obtain a degree of water impermeability, attempts have been made to coat the pile with a film or foil. This did give some degree of waterproofing, but this type of coating had very poor wear resistance, with the result that the coating esily became torn and delaminated much too readily.

In the course of research to find a product which would have substantially higher wear resistance while still retaining good insulating properties and at the same time would retain its pliability even at low temperatures, the applicant surprisingly discovered that it is possible to coat a pile fabric of this type with a water-soluble polyurethane, by following a certain sequence of steps.

According to the disclosure there is provided a method of preparing a coated knitted fabric or artificial fur pile comprising applying a foamed water-soluble polyurethane paste to a knitted fabric of artificial fur pile in two separate coating operations each followed by drying at a temperature not exceeding about 110° C., calendering the double-coated fabric and curing the product.

A preferred method according to the invention for coating a knitted fabric of artificial fur pile is characterised by the following steps:

(a) foaming a water soluble polyurethane, to which a foaming stabilizer and optionally pigments have been added, to a weight of about 250 grams per liter;

(b) applying a coating of the paste-like mass obtained in step (a) with a scraping tool on the knitted back side of the fur pile fabric at a pressure sufficient to ensure penetration of the polyurethane paste into the back of the fabric;

(c) passing the coated pile fabric through a three-stage drying chamber wherein the temperature in the respective stages is maintained at 90° C., 90° C. and 110° C. respectively;

(d) applying a second coating of the paste obtained in step (a) in a $\frac{1}{2}$–1 mm thick layer to the coated fur pile fabric;

(e) drying the double-coated artificial fur pile fabric as in step (c);

(f) calendering the double-coated pile at about 155° C. and a linear pressure of about 5–8 kg;

(g) curing the calendered fabric for about 2–4 minutes at 150° C.

In view of prior art techniques for coating woven fabric and textiles, it is surprising that it has proved possible to coat a pile fabric and obtain a temperature-resistant, tear-resistant material which at the same time is waterproof and has good insulating properties.

The method of the invention represents a substantial simplification, in that no pretreatment of the pile fabric prior to coating is necessary, apart from the above-mentioned drying to stabilize the width of the material.

An advantage of the invention is that the coating operation can be performed utilizing conventional equipment.

Another important feature of the invention is that the applied coating is a water-soluble polyurethane. This provides considerable advantage with respect to simplified production equipment, since there is no danger of explosion as is the case with dual-component polyurethanes.

For the initial coating, a commercially available, water soluble polyurethane to which a foaming stabilizer and optionally pigments have been added is foamed into a paste having a weight of 250 grams per liter and a consistency similar to shaving cream.

During the first coating operation, sufficient pressure is applied to the scraper knife that the mass is forced into the mesh of the knitted back of the pile. The pressure will be dependent on the consistency of the mass, but it is important that the mass penetrates into the back of the pile and thereby also secures the fibers knitted thereto, without penetrating through this into the fiber layer.

During the drying stage following both the first and second coating operations, the temperature is kept at the low level of maximum 110° C. in order to dry the fabric from the inside out without a crust forming, which will occur at too high temperatures.

The calendering step ensures a firm bond between the polyurethane in the knitted back side of the pile and the second polyurethane coating. Since a polyurethane without added curing agents is used, this bond is very strong and the delamination problems of pror art coatings are avoided.

In a simple and inexpensive fashion and without any unnecessary extra steps, the invention permits one to obtain a pile fabric with high temperature resistance, water impermeability and good insulation properties while retaining high tear resistance and wear resistance.

The coated fabric obtained with the method of the invention is especially well suited, for example, for making rescue blankets used by the armed forces and by first-aid or rescue teams, because the coated fabric can be subjected to ordinary washing at water temperatures up to 90° C., or be cleaned using any of the common chemical cleaning agents or by high pressure rinsng without adversely affecting the properties of the fabric.

Another application might be for the manufacture of thermally insulating articles of apparel, particularly for activities which require the wearer to sit still for extended periods of time in cold and possibly wet surroundings.

The present invention relates to a survival blanket, especially intended for holding and transporting sick and injured persons, which is characterized by consisting of a surface element divided into four areas, namely, a central, substantially rectangular body section, an adjacent, also substantially rectangular, smaller or inner fold flap, a similarly adjacent, also substantially rectangular, larger or outer fold flap, and a head section arranged at one end of the body section; on which carrying straps with loops are provided along the fold lines between the respective sections on the outside surface of the blanket, said straps being secured, preferably by sewing, to reinforcing straps provided along the fold lines, wherein the outer, free edge of the larger fold flap is provided with fastening means for engagement with corresponding fastening means along the outside surface of the fold edge, and wherein edge strips provided with drawstring closures are provided around the periphery of the head section and along the foot ends of the respective rectangular sections, for closing the ends of the bag.

As mentioned above, the blanket of the invention is made of an artificial fur pile fabric which has been coated on the knitted back side of the material with a water soluble polyurethane.

The blanket of the invention fulfills all of the requirements listed above for a survival blanket.

Figure 2:
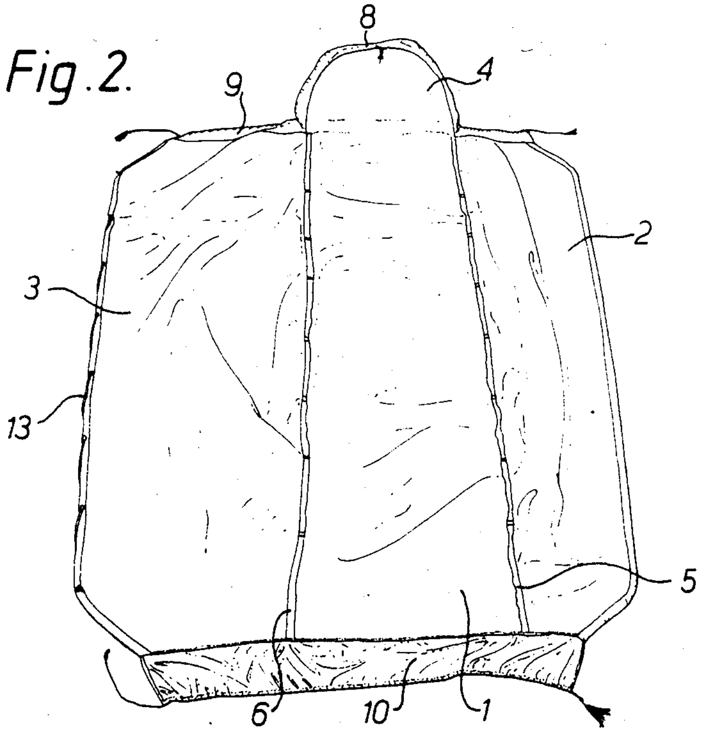
Figure 3:
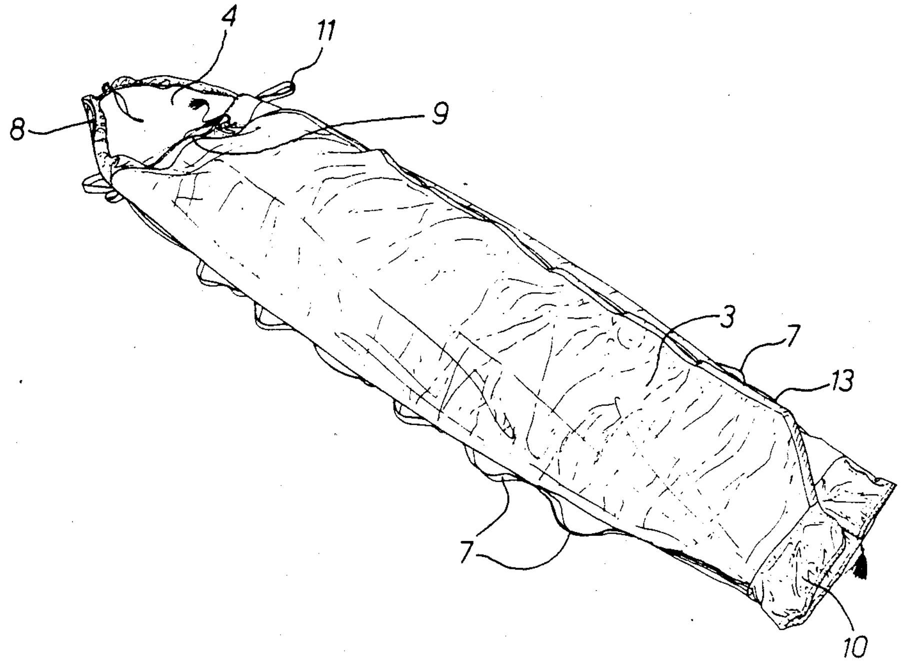

The invention will be described in greater detail in the following with reference to the accompanying drawings, wherein FIG. 1 shows a survival blanket as seen from the outside surface, FIG. 2 shows the same blanket as seen from the inside, and FIG. 3 shows the blanket in the folded state.

The survival blanket (FIGS. 1 and 2) of the invention consists of a substantially rectangular, centrally disposed body section 1, a smaller or inner fold flap 2 disposed along one longitudinal side of the body section 1, a larger or outer fold flap 3 disposed along the opposite longitudinal side of the body section 1, and a head section disposed at one end of the body section 1.

The fold flaps 2 and 3 can be folded inwardly over the main body section 1 along fold lines 5 and 6 (FIG. 3).

On the outside surface of the blanket, these fold lines are provided with carrying straps formed with loops 7, and the carrying stıaps are secured to longitudinal reinforcement strips on the inside of the blanket along the fold lines 5 and 6.

Around the periphery of the semicircular head section 4, and along the top (shoulder) and bottom (foot) ends of the three large sections 1,2,3, edge strips 8,9 and 10 with drawstring closures are provided, for closing the ends of the bag. When the survival blanket is in use, the patient is placed on the body section 1 with his head on the head section 4. First the smaller flap 2 and then the larger flap 3 are folded inwardly over the patient's body.

The larger fold flap 3 is provided with fastening means along the outer, free edge thereof which engage with corresponding fastening means on the exterior surface of the blanket along the fold line 5. Preferably, these fastening means consist of an elastic band 13 laced through eyes along the edge of the flap 3 which engage with hooks on the outside of the blanket along the fold line 5.

The carrying straps 11 are folded back on themselves to form free carrying loops 11. In the drawing, a loop 11 is shown at the head end, but a similar loop is preferably also formed at the foot end. After the patient has been placed on the blanket, the flaps folded over and the fastening means 13 secured to the corresponding fastening means along the fold line 5, the drawstrings in the edge strips 8,9 and 10 are drawn tight and the injured person is securely enclosed within the bag.

Using the loops 7 on the carrying straps, it is then possible to carry the patient either by inserting one's hands through the loops or by inserting rigid, elongated members such as a pole or small tree through the loops to form a stretcher. The stretcher is then carried by means of the free end loops 11.

In one embodiment, a survival blanket could be characterized as having a surface element divided into four areas, namely a centrally disposed, substantially rectangular body section, and adjacent, also substantially rectangular, smaller or inner fold flap, a similarly adjacent, also substantially rectangular larger or outer fold flap, and a head section disposed at one end of the body section. On the head section could be straps with loops provided along the fold lines and between the middle area and the sides areas, respectively, on the outside of the blanket. The straps would be secured preferably by sewing to reinforcing strips provided along the fold lines and wherein the outer free edge of the larger fold flap would be provided with fastening means for engagement with corresponding fastening means along the outside of the fold line. The edge strips with drawstring enclosures would be provided along the periphery of the head section and at the foot ends of the sections for closing the ends of the bag.

Furthermore, in one embodiment, the artificial fur could have a longer pile in the body section and head section than in the fold flap.

Owing to the provision of the drawstring closure at the foot end of the bag, it is possible using the free loops 11 at the shoulder end to lower an injured person over shorter distances, for example down the side of a mountain or glacier, or from a helicopter.

The invention thus provides a survival blanket having excellent insulation properties and which retains the favorable properties of the material down to at least −25° C., a blanket which is easy to transport and convenient to use, and which above all can be cleaned and maintained using any of the methods that are necessary to satisfy hygienic requirements, while at the same time the blanket can be manufactured at a price which makes it less expensive to use than the similar articles utilized today.

Having described my invention, I claim:

1. A survival blanket, especially intended for sick and injured persons, comprising a surface element divided into four areas, namely, a centrally disposed, substantially rectangular body section, an adjacent, also substantially rectangular, smaller or inner fold flap, a similarly adjacent, also substantially rectangular, larger or outer fold flap, and a head section disposed at one end of the body section; on which carrying straps with loops are provided along the fold lines and between the middle area and the side areas, respectively, on the outside surface of the blanket, said straps being secured, preferably by sewing, to reinforcing strips provided along the fold lines and, wherein the outer, free edge of the larger fold flap is provided with fastening means for engagement with corresponding fastening means along the outside of the fold line, and wherein edge strips, with drawstring closures are provided along the periphery of the head section and at the foot ends of the sections, for closing the ends of the bag.

2. A survival blanket according to claim 1, characterized in that the carrying straps, preferably at both ends thereof, are folded back on themselves to form free carrying loops.

3. A survival blanket according to claim 1, characterized in that the elastic bands are provided near the carrying loops at the head end of the blanket.

4. A survival blanket according to claim 1, characterized in that the fastening means comprise an elastic laced through eyes at the outer edge of the flap for engagement with hooks disposed along the fold line.

5. A survical blanket according to claim 1, characterized in that it comprises an artificial fur pile fabric that has been coated on the outside surface thereof with a water soluble polyurethane.

6. A survival blanket according to claim 5, characterized in that the artificial fur has a longer pile in the body section and head section than in the fold flaps.

* * * * *